United States Patent
Manolakos et al.

(10) Patent No.: US 10,469,298 B2
(45) Date of Patent: Nov. 5, 2019

(54) INCREASING REFERENCE SIGNAL DENSITY IN WIRELESS COMMUNICATIONS

(71) Applicant: QUALCOMM Incorporated, San Diego, CA (US)

(72) Inventors: Alexandros Manolakos, San Diego, CA (US); Yang Yang, San Diego, CA (US); Heechoon Lee, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/976,169

(22) Filed: May 10, 2018

(65) Prior Publication Data

US 2018/0331872 A1  Nov. 15, 2018

Related U.S. Application Data

(60) Provisional application No. 62/505,654, filed on May 12, 2017.

(51) Int. Cl.
| | |
|---|---|
| *H04L 27/26* | (2006.01) |
| *H04B 7/06* | (2006.01) |
| *H04B 7/0413* | (2017.01) |
| *H04B 7/0417* | (2017.01) |
| *H04B 7/01* | (2006.01) |

(Continued)

(52) U.S. Cl.
CPC ........ *H04L 27/2611* (2013.01); *H04B 7/0413* (2013.01); *H04B 7/0417* (2013.01); *H04B 7/0626* (2013.01); *H04L 27/2613* (2013.01); *H04B 7/01* (2013.01); *H04L 5/001* (2013.01);
(Continued)

(58) Field of Classification Search
None
See application file for complete search history.

(56) References Cited

U.S. PATENT DOCUMENTS

| | | | | |
|---|---|---|---|---|
| 8,265,043 | B2 * | 9/2012 | Kishiyama | ............ H04L 5/0044 370/336 |
| 9,614,653 | B2 * | 4/2017 | Kim | ..................... H04J 11/0053 |

(Continued)

OTHER PUBLICATIONS

International Search Report and Written Opinion—PCT/US2018/032261—ISA/EPO—dated Aug. 2, 2018 17 pages.

*Primary Examiner* — Berhanu Tadese
(74) *Attorney, Agent, or Firm* — Arent Fox, LLP

(57) ABSTRACT

Aspects herein describe increasing density of reference signal transmissions in wireless communications. A plurality of reference signal configurations, each indicating resource elements for one or more antenna ports over which reference signals for the one or more antenna ports are scheduled for transmission, can be received. An association configuration indicating an association between at least two antenna ports as having similar channel characteristics can also be received. A plurality of reference signals can be received in the resource elements corresponding to the at least two antenna ports as indicated in the at least two of the plurality of reference signal configurations, which can be used to perform a channel measurement of the similar channel characteristics of channels of the at least two antenna ports over at least a portion of the plurality of reference signals.

53 Claims, 11 Drawing Sheets

(51) Int. Cl.
H04L 25/02 (2006.01)
H04L 5/00 (2006.01)

(52) U.S. Cl.
CPC .......... *H04L 5/0048* (2013.01); *H04L 5/0051* (2013.01); *H04L 25/0222* (2013.01)

(56) References Cited

U.S. PATENT DOCUMENTS

| | | | | |
|---|---|---|---|---|
| 9,674,886 B2* | 6/2017 | Yang | | H04W 76/15 |
| 9,681,482 B2* | 6/2017 | Yang | | H04W 76/15 |
| 9,735,933 B2* | 8/2017 | Park | | H04W 72/04 |
| 9,769,811 B2* | 9/2017 | Lee | | H04L 5/0048 |
| 9,888,406 B2* | 2/2018 | Bergstrom | | H04W 28/0263 |
| 9,907,066 B2* | 2/2018 | Park | | H04L 5/0048 |
| 10,123,313 B2* | 11/2018 | Chen | | H04L 5/0048 |
| 10,306,589 B2* | 5/2019 | Tang | | H04W 4/70 |
| 2010/0027512 A1* | 2/2010 | Kishiyama | | H04W 5/0044 370/336 |
| 2011/0134879 A1* | 6/2011 | Ogawa | | H04L 5/0048 370/330 |
| 2012/0120905 A1* | 5/2012 | Ko | | H04B 7/0413 370/329 |
| 2014/0036800 A1* | 2/2014 | Frenne | | H04L 5/0035 370/329 |
| 2014/0036804 A1* | 2/2014 | Chen | | H04L 5/0053 370/329 |
| 2014/0126485 A1* | 5/2014 | Chen | | H04L 5/0053 370/329 |
| 2014/0126490 A1* | 5/2014 | Chen | | H04L 5/0048 370/329 |
| 2014/0334402 A1* | 11/2014 | Chen | | H04L 5/0035 370/329 |
| 2015/0180625 A1* | 6/2015 | Park | | H04W 72/04 370/329 |
| 2015/0230210 A1* | 8/2015 | Lee | | H04L 5/0048 370/329 |
| 2015/0319718 A1* | 11/2015 | Yang | | H04W 76/15 370/252 |
| 2015/0334762 A1* | 11/2015 | Yang | | H04W 76/15 370/329 |
| 2015/0349940 A1* | 12/2015 | Kim | | H04J 11/0053 370/329 |
| 2015/0358848 A1* | 12/2015 | Kim | | H04W 24/10 370/252 |
| 2016/0021565 A1* | 1/2016 | Kim | | H04L 5/005 370/329 |
| 2016/0088512 A1* | 3/2016 | Bergstrom | | H04W 28/0263 370/330 |
| 2016/0105264 A1* | 4/2016 | Chen | | H04W 4/70 370/329 |
| 2016/0211960 A1* | 7/2016 | Wang | | H04L 25/0224 |
| 2016/0227526 A1* | 8/2016 | Park | | H04L 5/0048 |
| 2016/0248561 A1* | 8/2016 | Davydov | | H04B 7/024 |
| 2016/0294514 A1* | 10/2016 | Tang | | H04W 4/70 |
| 2016/0309466 A1* | 10/2016 | Chen | | H04B 7/2628 |
| 2016/0345199 A1* | 11/2016 | Nogami | | H04L 5/003 |
| 2017/0005764 A1* | 1/2017 | Park | | H04J 11/005 |
| 2017/0070312 A1* | 3/2017 | Yi | | H04J 11/0069 |
| 2017/0078062 A1* | 3/2017 | Park | | H04B 7/26 |
| 2017/0105112 A1* | 4/2017 | Park | | H04L 5/00 |
| 2017/0118665 A1* | 4/2017 | Park | | H04W 24/08 |
| 2017/0118745 A1* | 4/2017 | Nogami | | H04W 72/0446 |
| 2017/0201898 A1* | 7/2017 | Park | | H04W 16/32 |
| 2017/0215097 A1* | 7/2017 | Park | | H04B 17/318 |
| 2017/0223686 A1* | 8/2017 | You | | H04L 5/0048 |
| 2017/0230992 A1* | 8/2017 | Patel | | H04B 7/0413 |
| 2017/0288743 A1* | 10/2017 | Nam | | H04B 7/024 |
| 2017/0331577 A1* | 11/2017 | Parkvall | | H04J 11/0079 |
| 2017/0331670 A1* | 11/2017 | Parkvall | | H04W 52/0274 |
| 2017/0374675 A1* | 12/2017 | Hwang | | H04W 72/04 |
| 2018/0034525 A1* | 2/2018 | Park | | H04L 5/00 |
| 2018/0054797 A1* | 2/2018 | Islam | | H04B 7/0617 |
| 2018/0062720 A1* | 3/2018 | Islam | | H04B 7/0695 |
| 2018/0062807 A1* | 3/2018 | Seo | | H04L 1/00 |
| 2018/0102817 A1* | 4/2018 | Park | | H04B 7/04 |
| 2018/0115357 A1* | 4/2018 | Park | | H04B 7/04 |
| 2018/0205585 A1* | 7/2018 | Sadiq | | H04L 5/0023 |
| 2018/0220403 A1* | 8/2018 | John Wilson | | H04W 72/044 |
| 2018/0263024 A1* | 9/2018 | John Wilson | | H04B 7/0695 |
| 2018/0270689 A1* | 9/2018 | Akkarakaran | | H04B 7/088 |
| 2018/0270799 A1* | 9/2018 | Noh | | H04L 27/261 |
| 2018/0288737 A1* | 10/2018 | Islam | | H04W 68/02 |
| 2018/0317214 A1* | 11/2018 | Ding | | H04B 7/0695 |
| 2018/0331872 A1* | 11/2018 | Manolakos | | H04L 27/2611 |

* cited by examiner

INCREASING REFERENCE SIGNAL DENSITY IN WIRELESS COMMUNICATIONS

CLAIM OF PRIORITY UNDER 35 U.S.C. § 119

The present Application for Patent claims priority to Provisional Application No. 62/505,654, entitled "INCREASING REFERENCE SIGNAL DENSITY IN WIRELESS COMMUNICATIONS" filed May 12, 2017, which is assigned to the assignee hereof and hereby expressly incorporated by reference herein for all purposes.

BACKGROUND

Aspects of the present disclosure relate generally to wireless communication systems, and more particularly, to transmitting reference signals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include services such as: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In long term evolution (LTE), for example, access points (e.g., Node B) transmit cell-specific reference signals (CRSs) to drive tracking loops at access nodes (e.g., user equipment (UE)). The CRSs allow for desirable processing gain and robust tracking performance by the UE to provide fine time tracking, fine frequency tracking, Doppler spread estimation and/or delay spread estimation. For example, the CRSs in LTE can span the entire system bandwidth (thus allowing fine time-domain resolution), have a ⅓ density after de-staggering (thus allowing desirable time-domain pull-in range), have guaranteed phase continuity, allow multiple observations per subframe (thus allowing desirable frequency domain pull-in range), are always transmitted by the access point, and can use 2-port transmission for spatial diversity. With the evolution of 5G, however, CRSs may no longer be practical as the always-on nature can introduce pilot pollution, leads to unnecessary energy consumption (e.g., when the network load is light), and/or gets in the way of flexible resource utilization and/or blanking.

Generally, in 5G, long term evolution (LTE), and/or other wireless communications, access points can also transmit channel state information reference signals (CSI-RSs) to user equipment (UE) for each of a plurality of antenna ports. The UEs can measure the CSI-RSs to determine channel characteristics (or channel state information (CSI)) for the corresponding antenna ports. Thus, the access point can also transmit a plurality of CSI-RS configurations to the UE to indicate resource elements (REs) over which CSI-RSs are transmitted for each of the corresponding antenna ports. With the sparse density of a given CSI-RS, however, a UE may not be able to acquire fine time/frequency tracking, Doppler spread estimation, delay spread estimation, etc. as previously attainable using CRSs in LTE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for increasing density of reference signal transmissions in wireless communications is provided. The method includes receiving a plurality of reference signal configurations each indicating resource elements for one or more antenna ports over which reference signals for the one or more antenna ports are scheduled for transmission, receiving an association configuration indicating an association between at least two antenna ports as relating to similar channel characteristics, where the at least two antenna ports correspond to antenna ports in at least two of the plurality of reference signal configurations, receiving a plurality of reference signals in the resource elements corresponding to the at least two antenna ports as indicated in the at least two of the plurality of reference signal configurations, and performing, based at least in part on the association configuration, a channel measurement of the similar channel characteristics of channels of the at least two antenna ports over at least a portion of the plurality of reference signals received over the resource elements corresponding to the at least two antenna ports.

In another example, an apparatus for wireless communication is provided that includes a transceiver for communicating one or more wireless signals via at least a transmitter and one or more antennas, a memory configured to store instructions, and one or more processors communicatively coupled with the transceiver and the memory. The one or more processors are configured to receive a plurality of reference signal configurations each indicating resource elements for one or more antenna ports over which reference signals for the one or more antenna ports are scheduled for transmission, receive an association configuration indicating an association between at least two antenna ports as relating to similar channel characteristics, where the at least two antenna ports correspond to antenna ports in at least two of the plurality of reference signal configurations, receive a plurality of reference signals in the resource elements corresponding to the at least two antenna ports as indicated in the at least two of the plurality of reference signal configurations, and perform, based at least in part on the association configuration, a channel measurement of the similar channel characteristics of channels of the at least two antenna ports over at least a portion of the plurality of reference signals received over the resource elements corresponding to the at least two antenna ports.

In another example, an apparatus for wireless communication is provided. The apparatus includes means for receiving a plurality of reference signal configurations each indicating resource elements for one or more antenna ports over which reference signals for the one or more antenna ports are scheduled for transmission, means for receiving an association configuration indicating an association between at least two antenna ports as relating to similar channel characteristics, where the at least two antenna ports correspond to antenna ports in at least two of the plurality of reference signal configurations, means for receiving a plurality of reference signals in the resource elements corresponding to the at least two antenna ports as indicated in the at least two of the plurality of reference signal configurations, and means for performing, based at least in part on the association configuration, a channel measurement of the similar channel characteristics of channels of the at least two antenna ports over at least a portion of the plurality of reference signals received over the resource elements corresponding to the at least two antenna ports.

In another example, a computer-readable medium including code executable by one or more processors for wireless communication is provided. The code includes code for receiving a plurality of reference signal configurations each indicating resource elements for one or more antenna ports over which reference signals for the one or more antenna ports are scheduled for transmission, code for receiving an association configuration indicating an association between at least two antenna ports as relating to similar channel characteristics, where the at least two antenna ports correspond to antenna ports in at least two of the plurality of reference signal configurations, code for receiving a plurality of reference signals in the resource elements corresponding to the at least two antenna ports as indicated in the at least two of the plurality of reference signal configurations, and code for performing, based at least in part on the association configuration, a channel measurement of the similar channel characteristics of channels of the at least two antenna ports over at least a portion of the plurality of reference signals received over the resource elements corresponding to the at least two antenna ports.

In yet another example, a method for increasing density of reference signal transmissions in wireless communications is provided. The method includes transmitting a plurality of reference signal configurations each indicating resource elements for one or more antenna ports over which reference signals for the one or more antenna ports are scheduled for transmission, transmitting an association configuration indicating an association between at least two antenna ports as relating to similar channel characteristics, where the at least two antenna ports correspond to antenna ports in at least two of the plurality of reference signal configurations. and transmitting, based at least in part on the association configuration, reference signals based on the similar channel characteristics over the resource elements corresponding to the at least two antenna ports in at least two of the plurality of reference signal configurations corresponding to the at least two antenna ports.

In another example, an apparatus for wireless communication is provided. The apparatus includes a transceiver for communicating one or more wireless signals via at least a transmitter and one or more antennas, a memory configured to store instructions, and one or more processors communicatively coupled with the transceiver and the memory. The one or more processors are configured to transmit a plurality of reference signal configurations each indicating resource elements for one or more antenna ports over which reference signals for the one or more antenna ports are scheduled for transmission, transmit an association configuration indicating an association between at least two antenna ports as relating to similar channel characteristics, where the at least two antenna ports correspond to antenna ports in at least two of the plurality of reference signal configurations, and transmit, based at least in part on the association configuration, reference signals based on the similar channel characteristics over the resource elements corresponding to the at least two antenna ports in at least two of the plurality of reference signal configurations corresponding to the at least two antenna ports.

In another example, an apparatus for wireless communication is provided that includes means for transmitting a plurality of reference signal configurations each indicating resource elements for one or more antenna ports over which reference signals for the one or more antenna ports are scheduled for transmission, means for transmitting an association configuration indicating an association between at least two antenna ports as relating to similar channel characteristics, where the at least two antenna ports correspond to antenna ports in at least two of the plurality of reference signal configurations, and means for transmitting, based at least in part on the association configuration, reference signals based on the similar channel characteristics over the resource elements corresponding to the at least two antenna ports in at least two of the plurality of reference signal configurations corresponding to the at least two antenna ports.

In another example, a computer-readable medium including code executable by one or more processors for wireless communication is provided. The code includes code for transmitting a plurality of reference signal configurations each indicating resource elements for one or more antenna ports over which reference signals for the one or more antenna ports are scheduled for transmission, code for transmitting an association configuration indicating an association between at least two antenna ports as relating to similar channel characteristics, where the at least two antenna ports correspond to antenna ports in at least two of the plurality of reference signal configurations, and code for transmitting, based at least in part on the association configuration, reference signals based on the similar channel characteristics over the resource elements corresponding to the at least two antenna ports in at least two of the plurality of reference signal configurations corresponding to the at least two antenna ports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
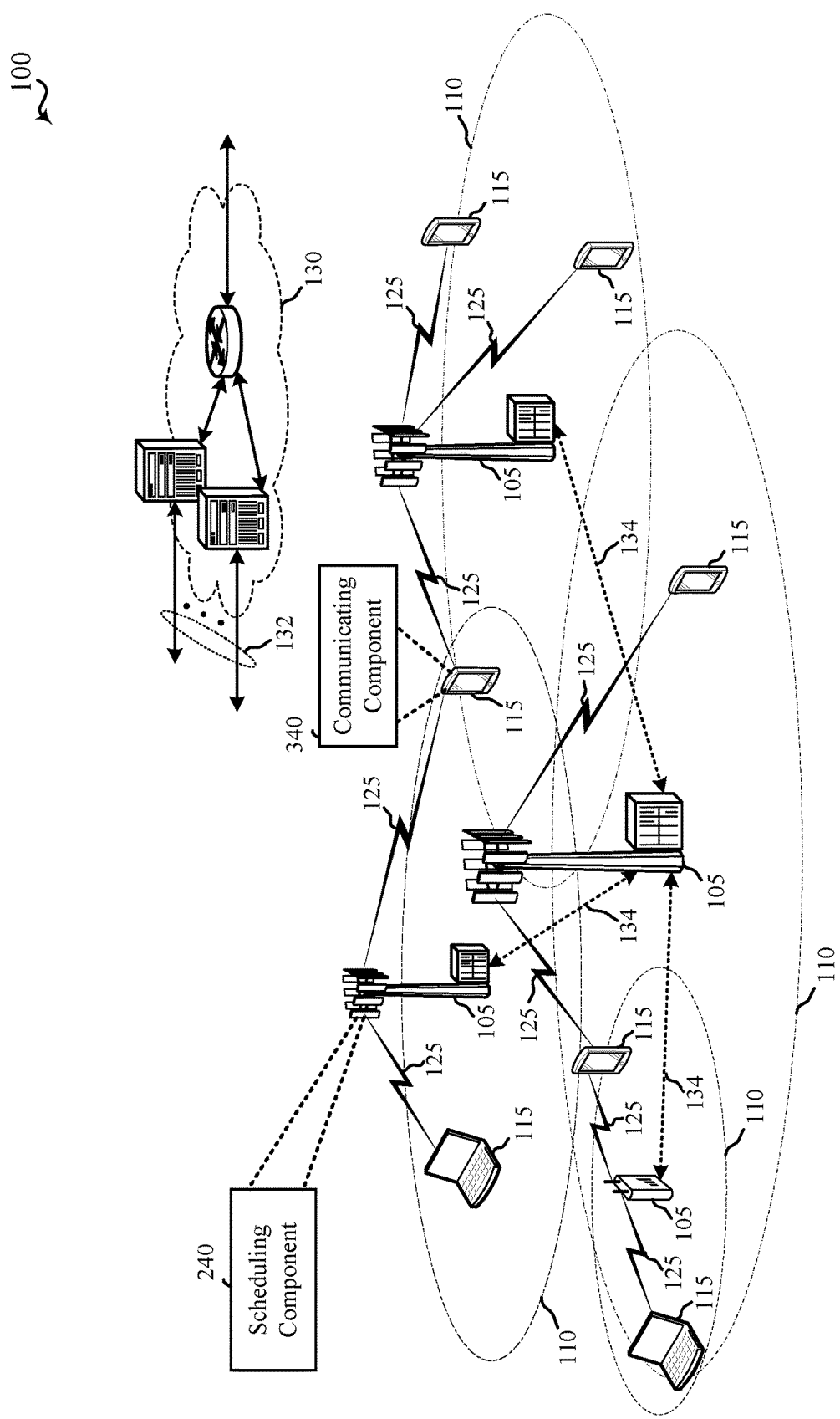
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using separately transmitted reference signals as a reference for time and/or frequency tracking. For example, separately transmitted reference signals can be associated as having similar channel characteristics to effectively increase reference signal density for tracking purposes. In this regard, tracking can be provided in wireless communication technologies, such as in fifth generation (5G) new radio (NR), or other wireless communication technologies, without necessarily requiring cell-specific reference signals (CRS) or other full-symbol signals, as defined in long term evolution (LTE) or other legacy wireless communication technologies.

For example, an access point can transmit multiple reference signals (RSs) over multiple sets of resource elements (REs), where each RS can relate to one or more antenna ports configured at the access point. An access node can accordingly measure signals transmitted over the REs to determine channel information. For example, the RSs can be channel state information (CSI)-RSs and the access node can measure channel state information (CSI) for the antenna ports based on the CSI-RSs. In an example, the access point can transmit configurations for each of the antenna ports to the access node, where the configurations can include an identifier of the one or more antenna ports and associated REs. In addition, the access point can transmit some RSs using similar channel characteristics, and can indicate the RSs, or associated antenna ports, to the access node to facilitate association of the RSs for tracking purposes. In this regard, for example, the access node can receive and associate the RSs as having similar characteristics such to perform fine time/frequency tracking, determine a Doppler spread estimation, determine a delay spread estimation, etc.

In a specific example, the access point can transmit CSI-RS per-antenna port and associated configurations indicating REs corresponding to a given CSI-RS and/or indicating the corresponding antenna port. For example, CSI-RS can support at least 32 antenna ports (e.g., virtual or physical antenna ports), and the RE pattern for an X-port CSI-RS resource can span N OFDM symbols in a slot, where N is greater than or equal to 1, and can include one or more component CSI-RS RE patterns. A component CSI-RS RE pattern can be defined within a single physical resource block (PRB) as Y adjacent REs in the frequency domain and Z adjacent REs in the time domain. At least N={1, 2, 4} can be supported, and the N OFDM symbols can be adjacent or non-adjacent. At least CSI-RS for CSI acquisition, NR can support CSI-RS density d RE/RB/port for x-port CSO-RS, where values of d can be at least d=1, ½. In addition, in NR, non-zero power (NZP) CSI-RS resources can be defined as a set of NZP CSI-RS port(s) mapped to a set of REs within a frequency span and/or a time duration, which can be measured at least to derive a CSI, and multiple NZP CSI-RS resources can be configured.

In an example, the access point can transmit at least two of the CSI-RSs using similar channel characteristics, and can indicate an association between the CSI-RSs (e.g., between the antenna ports and/or corresponding REs). An access node can use the indicated association to associate the RSs received from the access point over the corresponding REs in performing a channel measurement over the REs associated with the at least two CSI-RSs. This can allow for effectively increasing density of the RSs transmitted with similar channel characteristics, to allow for achieving the one or more tracking purposes (e.g., to perform time and/or frequency tracking of the access point), without requiring transmission of a separate reference signal for tracking.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by the UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access by the UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between the base stations 105 and UEs 115. Additionally or alternatively, the base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, a base station 105 may include a scheduling component 240 for scheduling resources to one or more UEs 115 to facilitate receiving RSs from the base station 105 and/or for communicating associated CSI feedback to the base station 105, and the UE 115 may include a communicating component 340 for receiving the resource scheduling and accordingly receiving the RSs and/or communicating the CSI feedback. The scheduling component 240, for example, may be configured to indicate multiple CSI-RS configurations indicating REs over which CSI-RSs are transmitted for one or more antenna ports (e.g., per CSI-RS configuration) and may also be configured to indicate an association between REs and/or corresponding antenna ports as being transmitted using similar channel characteristics. The communicating component 340 can receive the multiple CSI-RS configurations and the indication of the association, and may perform channel measurements over the associated REs to achieve a denser RS for which to perform the channel measurements (e.g., as opposed to CSI-RS related to a single antenna port and received over a single smaller set of REs).

Figure 2:
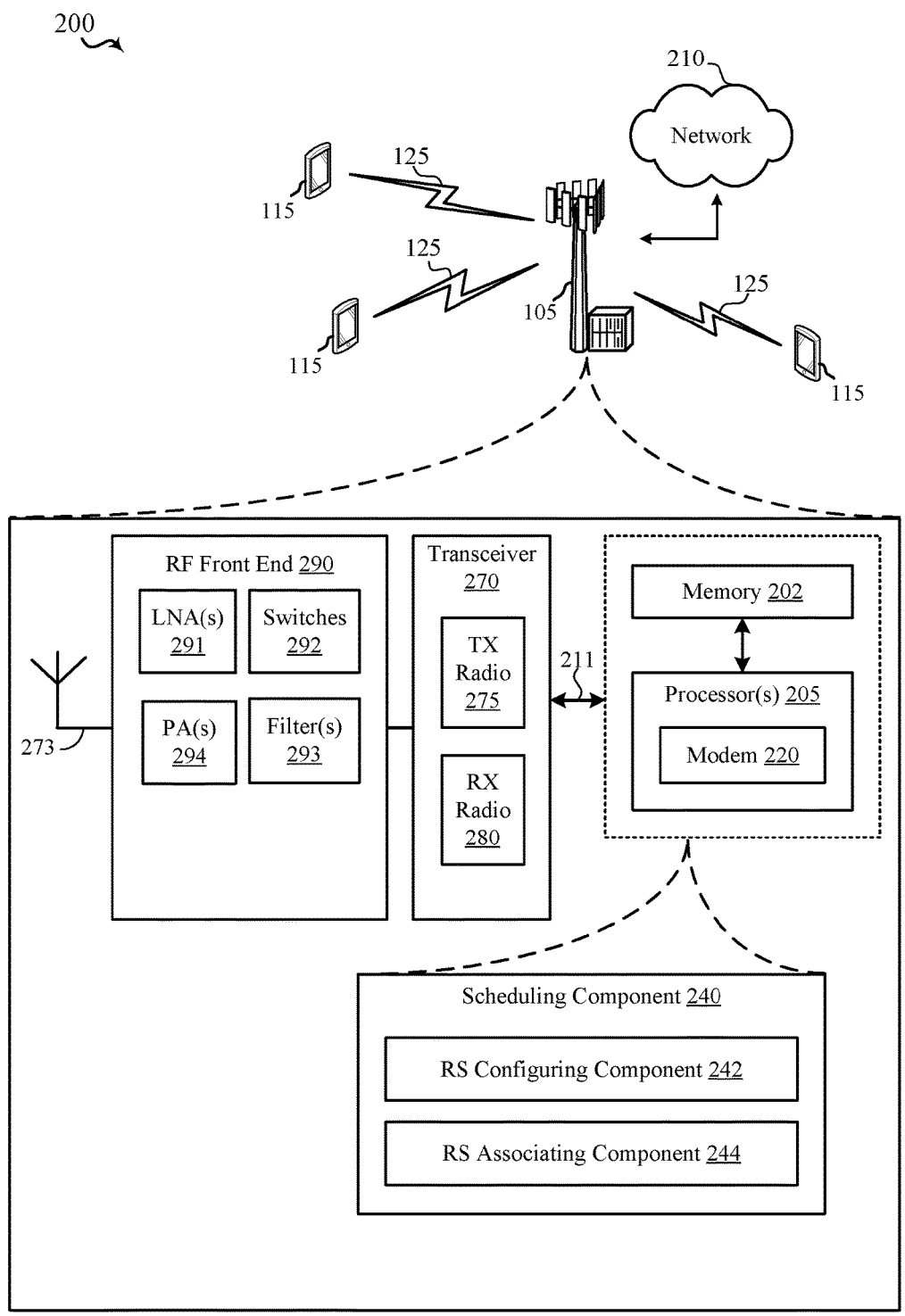
FIG. 2 is a block diagram illustrating an example of a base station, in accordance with various aspects of the present disclosure.
Figure 3:
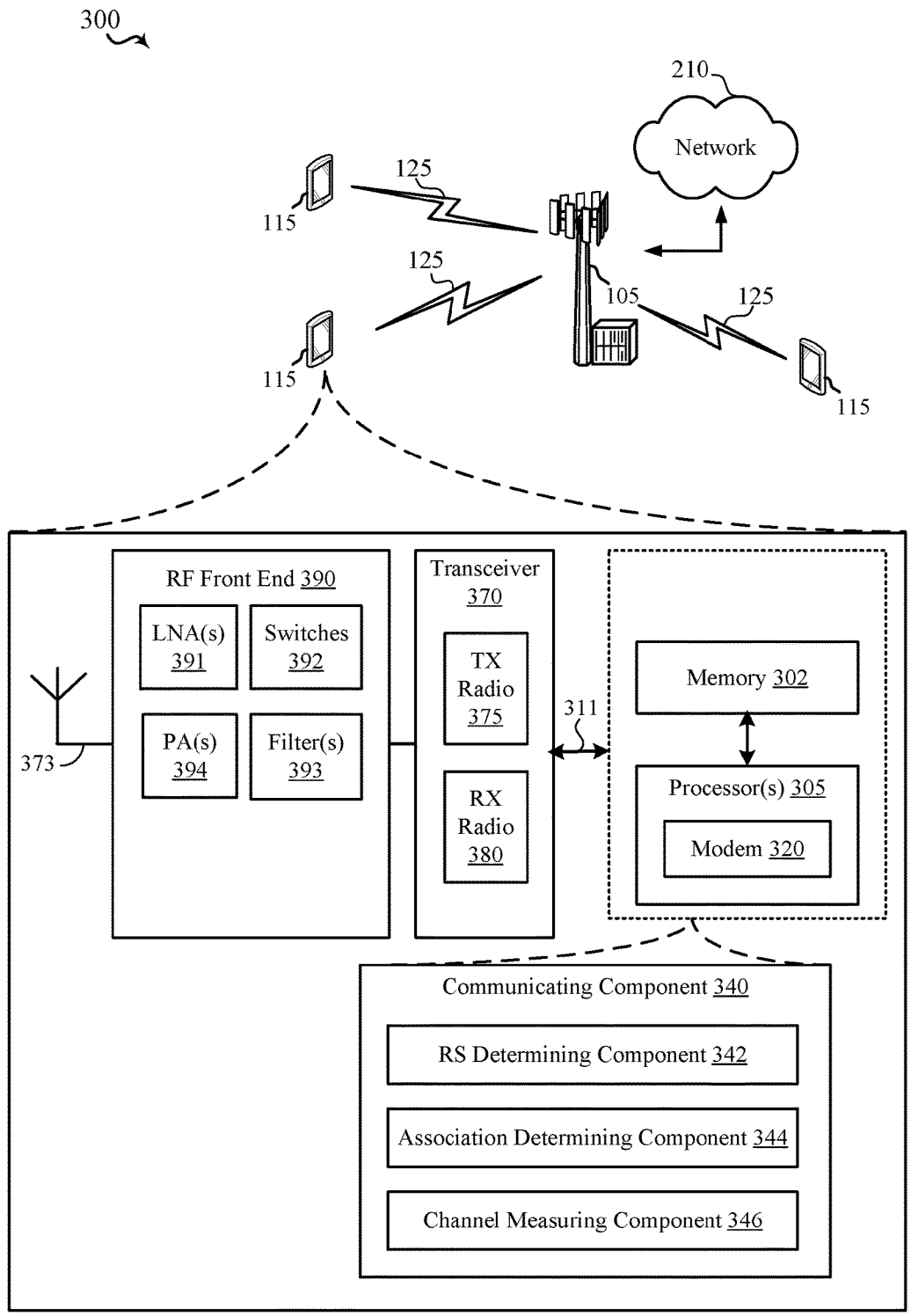
FIG. 3 is a block diagram illustrating an example of a UE, in accordance with various aspects of the present disclosure.
Figure 4:
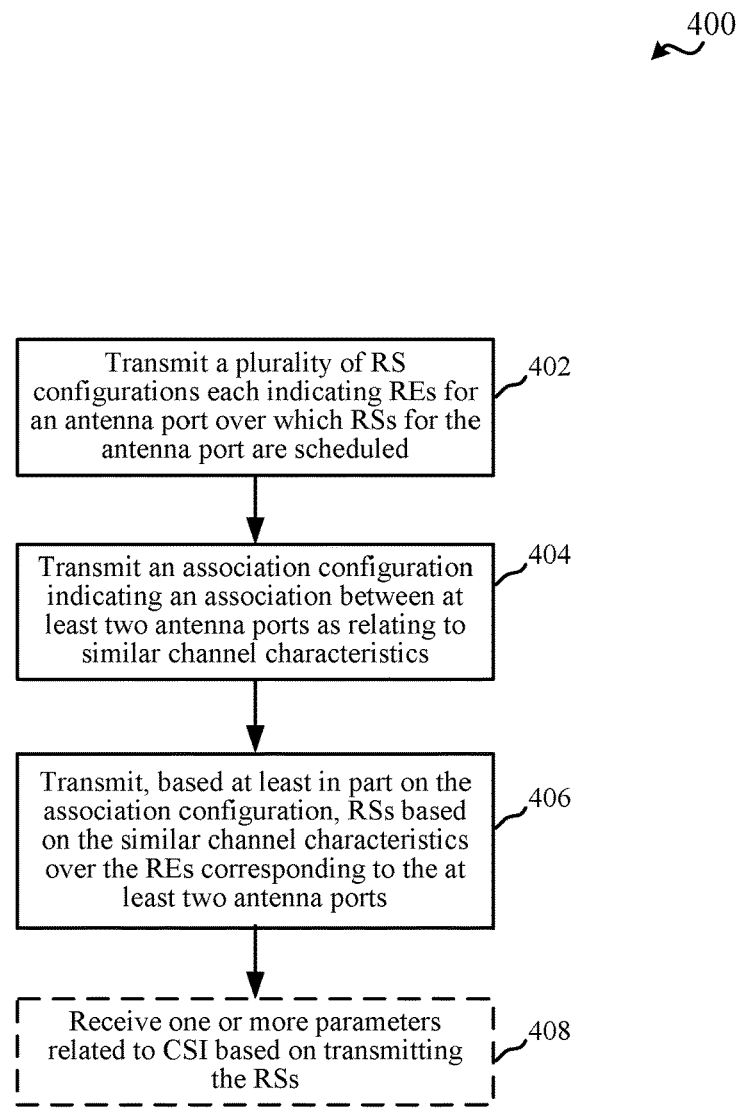
FIG. 4 is a flow chart illustrating an example of a method for transmitting reference signals, in accordance with various aspects of the present disclosure.
Figure 5:
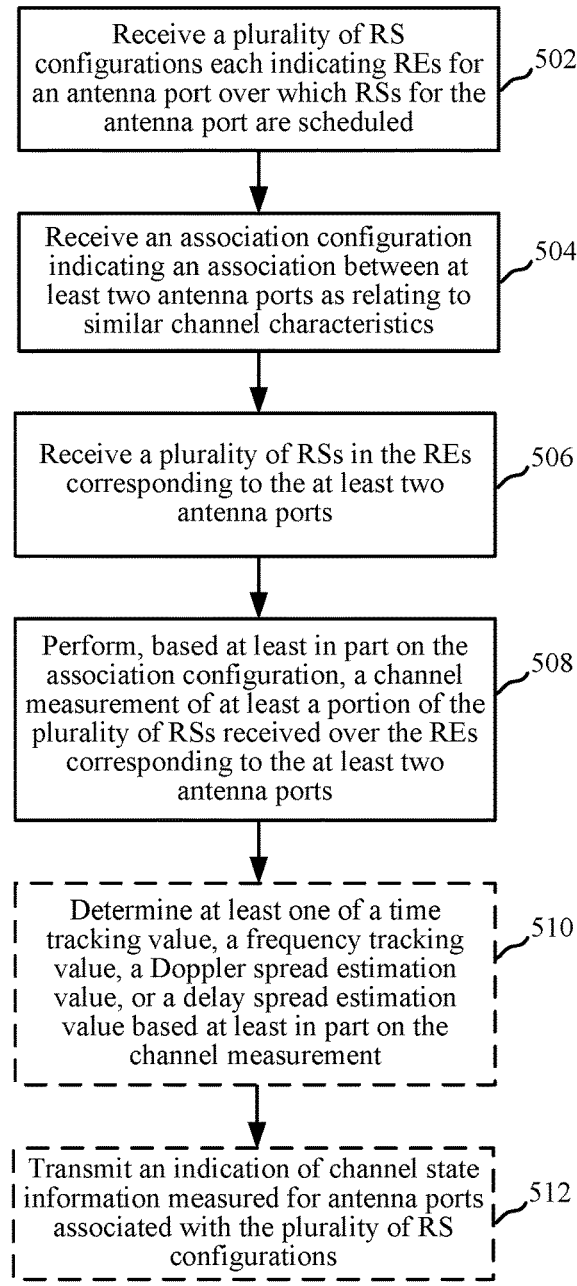
FIG. 5 is a flow chart illustrating an example of a method for receiving reference signals, in accordance with various aspects of the present disclosure.

Turning now to FIGS. 2-10, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to receive RS configurations and/or an indication of association between REs corresponding to at least a portion of REs defined in the RS configurations. Moreover the base station 105 may be an example of the base stations described in the present disclosure (e.g., eNB, gNB, etc.) that are configured to transmit RS configurations and/or an indication of an association between at least a portion of REs defined in the RS configurations.

In an aspect, the base station in FIG. 2 may include one or more processors 205 and/or memory 202 that may operate in combination with a scheduling component 240 to perform the functions, methodologies (e.g., method 400 of FIG. 4), or other methods presented in the present disclosure, which may include scheduling communication resources for one or more UEs 115. In accordance with the present disclosure, the scheduling component 240 may include a RS configuring component 242 for transmitting one or more RS configurations to a UE 115 to indicate REs over which RSs are to be transmitted and/or for generating the corresponding RSs for transmission, and/or an RS associating component 244 for indicating an association between REs of at least two of the RSs as being transmitted with similar channel characteristics.

The one or more processors 205 may include a modem 220 that uses one or more modem processors. The various functions related to the scheduling component 240, and/or sub-components thereof, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs 115. The RF front end 290 may be communicatively coupled with one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 10. Similarly, the memory 202 may correspond to the memory described in connection with the base station in FIG. 10.

Referring to FIG. 3, a block diagram 300 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to receive RS configurations and/or an indication of association between REs corresponding to at least a portion of REs defined in the RS configurations. Moreover the base station 105 may be an example of the base stations described in the present disclosure (e.g., eNB, gNB, etc.) that are configured to transmit RS configurations and/or an indication of an association between at least a portion of REs defined in the RS configurations.

In an aspect, the UE 115 in FIG. 3 may include one or more processors 305 and/or memory 302 that may operate in combination with a communicating component 340 to perform the functions, methodologies (e.g., method 500 of FIG. 5), or other methods presented in the present disclosure. In accordance with the present disclosure, the communicating component 340 may include a RS determining component 342 for determining one or more RS configurations indicating resources over which RSs are transmitted and/or for processing received RSs, an association determining component 344 for determining an association between REs associated with two or more RSs as being transmitted with similar channel characteristics, and/or a channel measuring component 346 for performing a channel measurement over the REs associated with two or more RSs for tracking purposes and/or for determining CSI corresponding to at least one of the RSs.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. The RF front end 390 may be communicatively coupled with one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 10. Similarly, the memory 302 may correspond to the memory described in connection with the UE in FIG. 10.

FIG. 4 illustrates a flow chart of an example of a method 400 for transmitting (e.g., by an access point or base station, such as an eNB, gNB, etc.) one or more RS configurations related to, or otherwise indicating one or more parameters regarding, RSs transmitted in corresponding REs, and/or a configuration indicating an association between REs as being transmitted with similar channel characteristics. FIG. 5 illustrates a flow chart of an example of a method 500 for receiving (e.g., by an access node, such as a UE) one or more RS configurations related to RSs transmitted in corresponding REs, and/or a configuration indicating an association between REs as being transmitted with similar channel characteristics. In methods 400 and 500, blocks indicated as dashed boxes may represent optional steps.

In method 400, at Block 402, a plurality of RS configurations, each indicating REs for an antenna port over which RSs for the antenna port are scheduled, can be transmitted. In an aspect, the RS configuring component 242, e.g., in conjunction with processor(s) 205, memory 202, transceiver 270 and/or scheduling component 240, can generate and transmit a plurality of RS configurations, with each RS configuration indicating REs for an antenna port over which RSs for the antenna port are scheduled. For example, RS configuring component 242 can generate an RS configuration for a given antenna port (or multiple antenna ports) indicating the REs in a physical resource block (PRB) over which an RS for the antenna port(s) is transmitted. For example, the RS can be a CSI-RS. In addition, for example, RS configuring component 242 can transmit the RS configurations to the UE 115 using RRC or other higher layer signaling, dedicated control channel signaling, broadcast signaling (e.g., one or more master information blocks (MIBs) or system information blocks (SIBs)), etc. One or more of the RS configurations, in a specific example, may correspond to NZP CSI-RS configurations.

Figure 6:
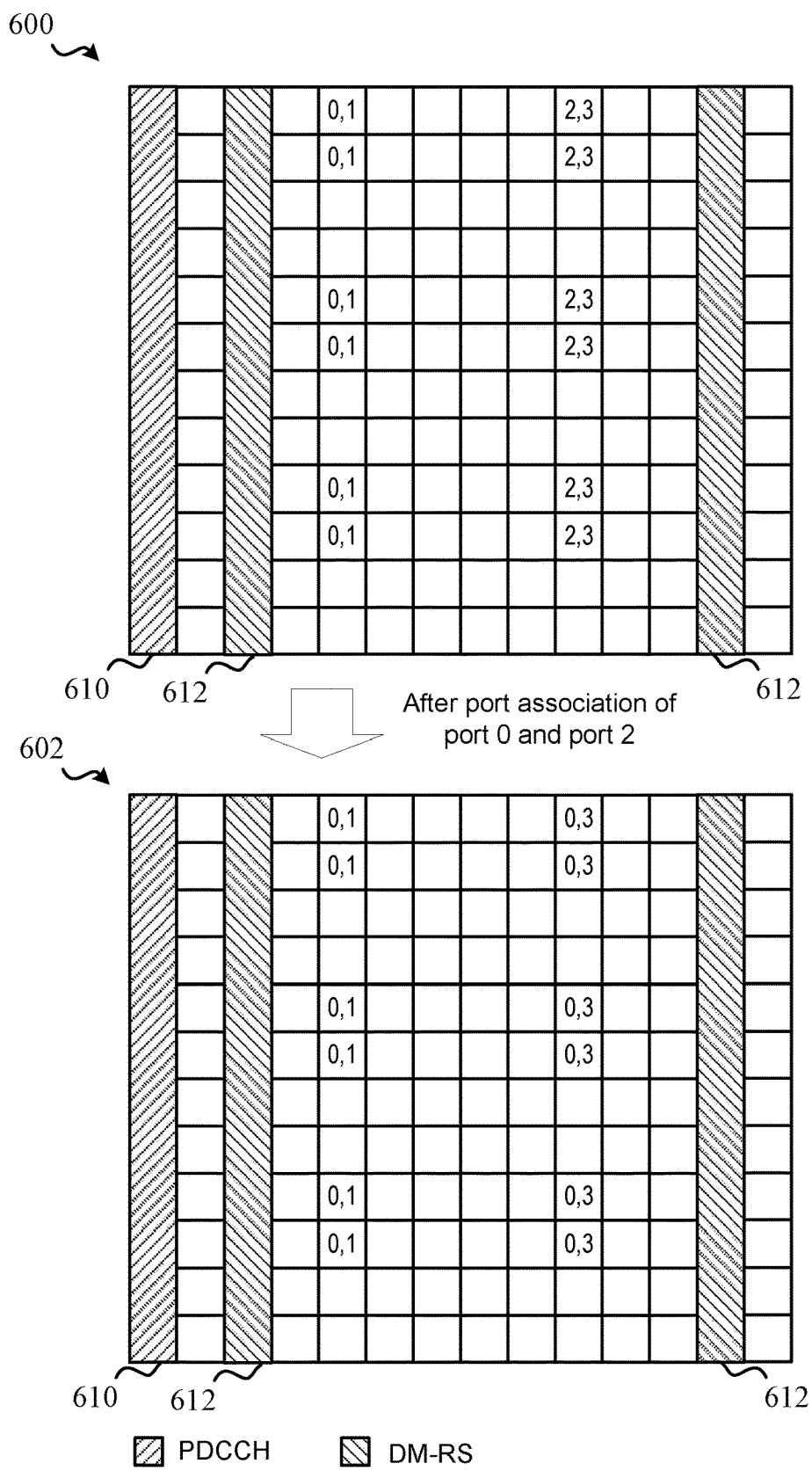
FIG. 6 illustrates examples of resource allocations for reference signals having frequency density, in accordance with various aspects of the present disclosure.
Figure 7:
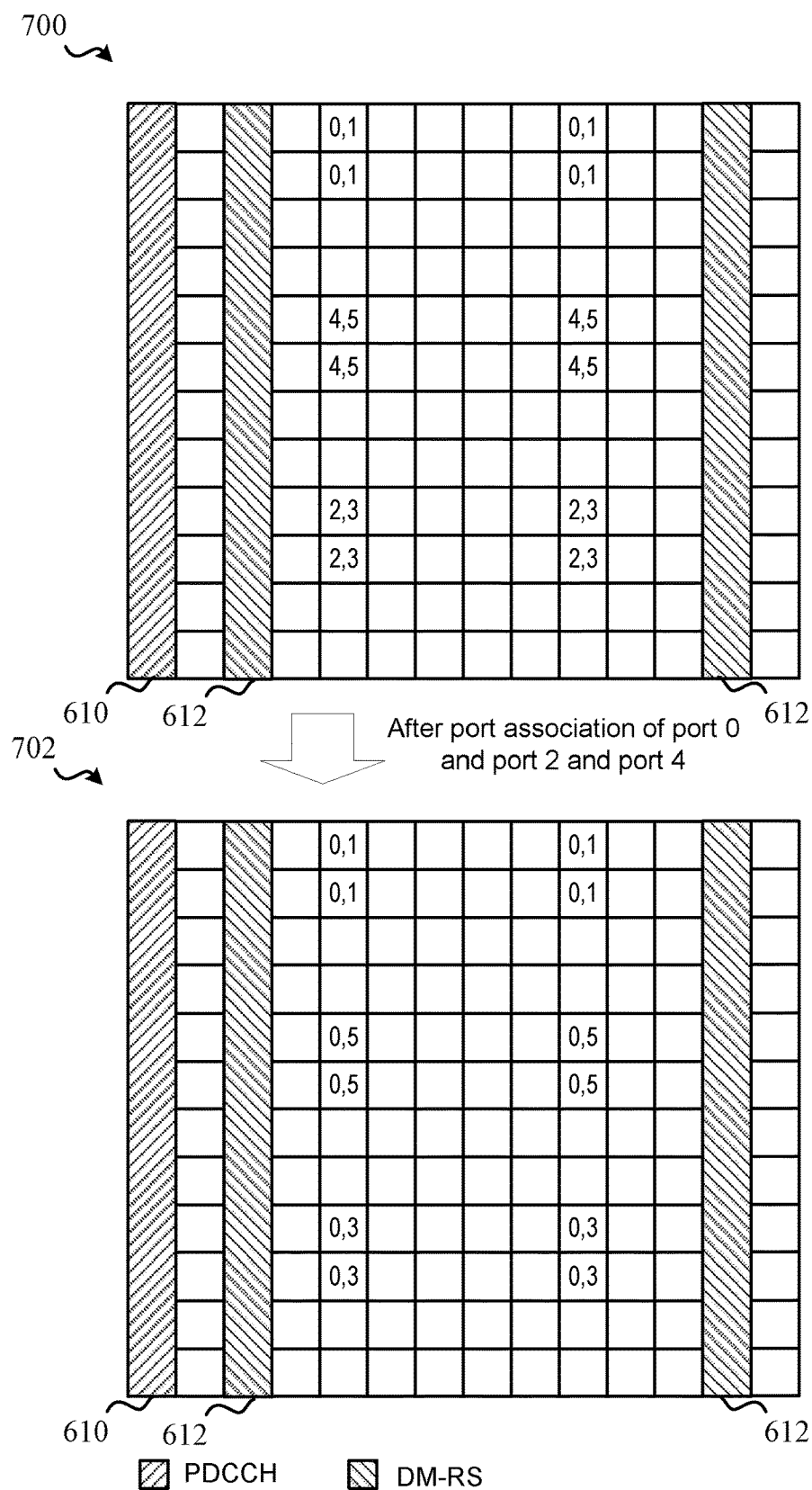
FIG. 7 illustrates examples of resource allocations for reference signals having time density, in accordance with various aspects of the present disclosure.
Figure 8A:
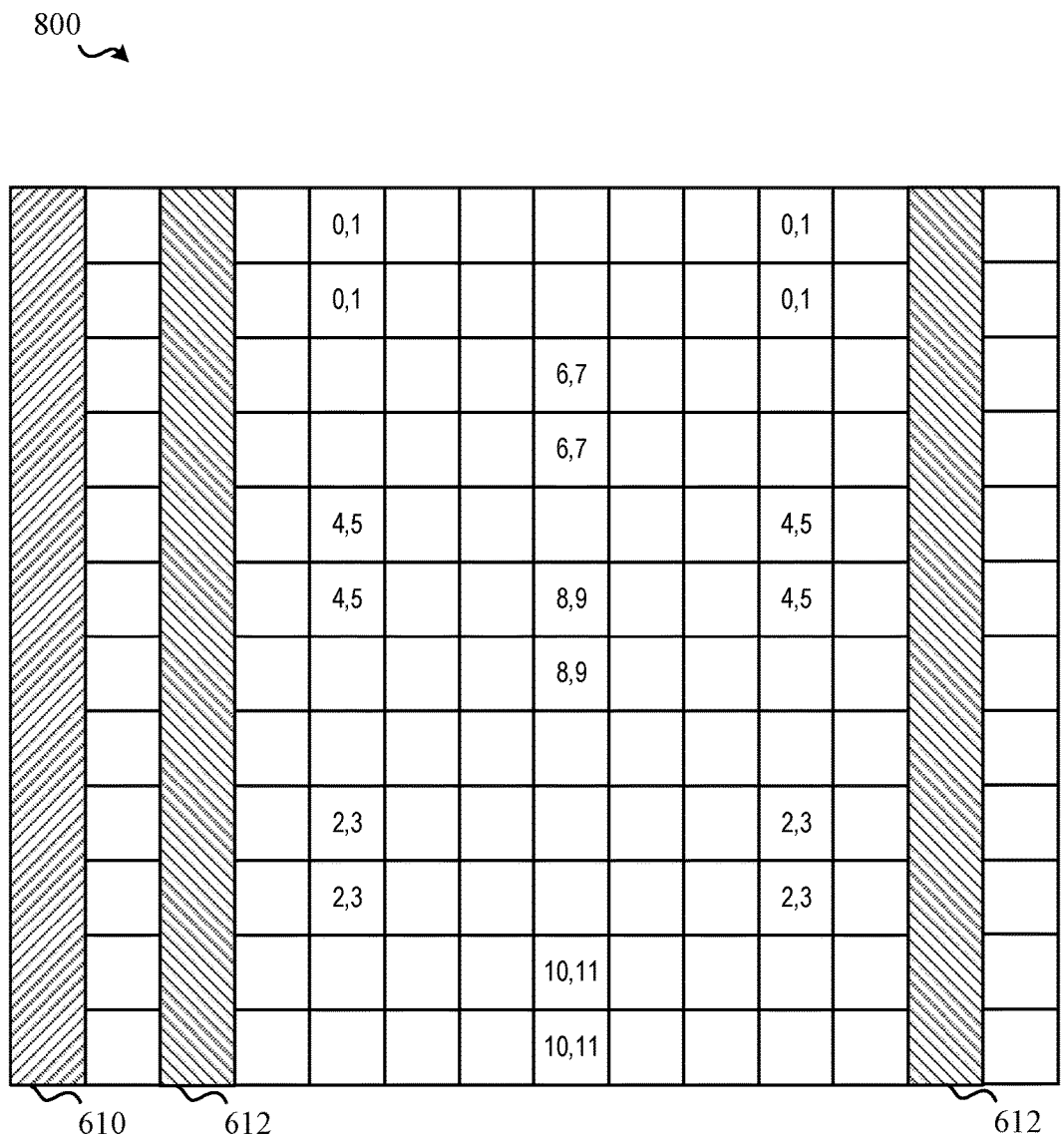
FIGS. 8A-8B illustrate examples of resource allocations for reference signals having uniform frequency allocation when de-staggering time domain, in accordance with various aspects of the present disclosure.
Figure 8B:
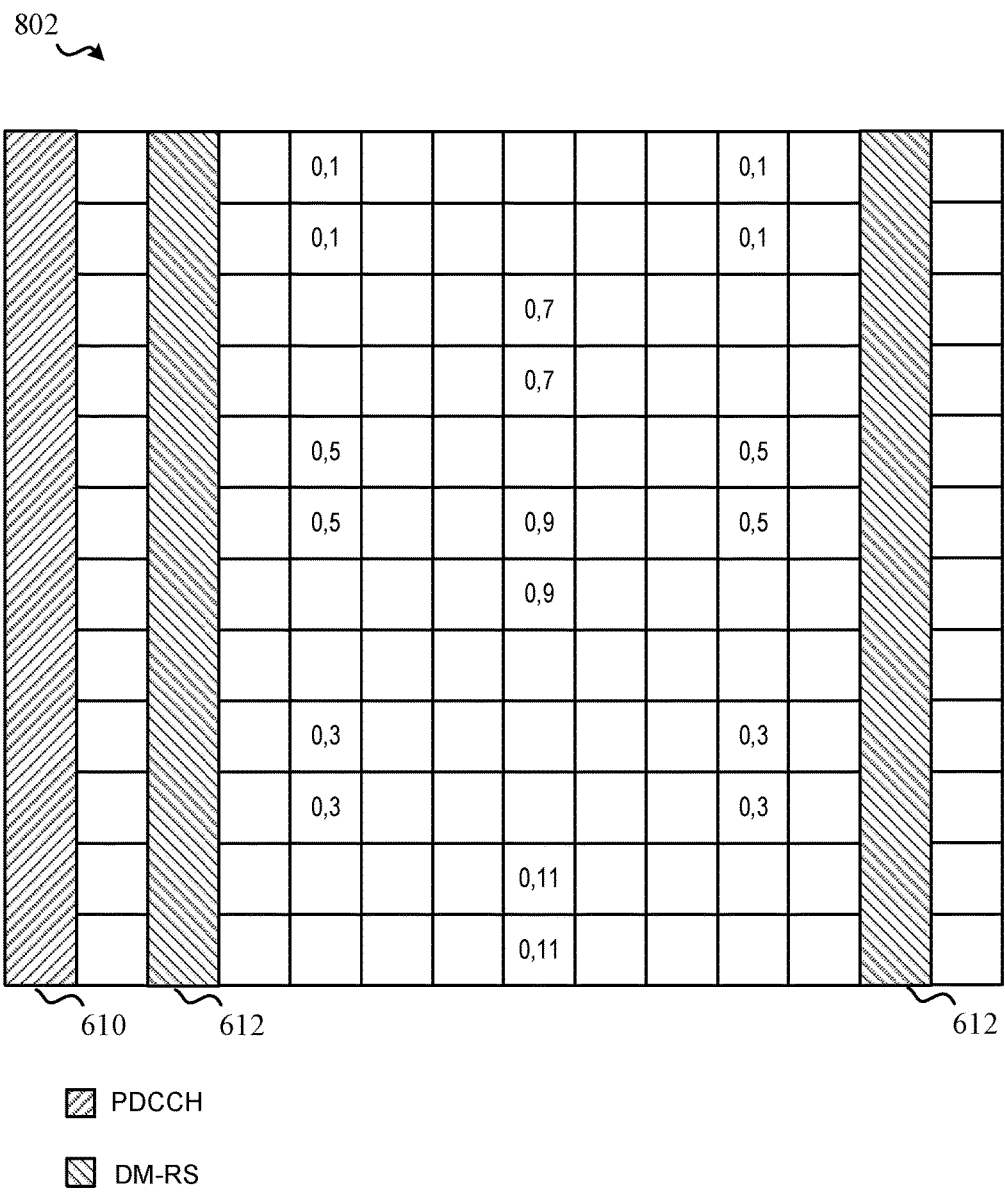
Figure 9:
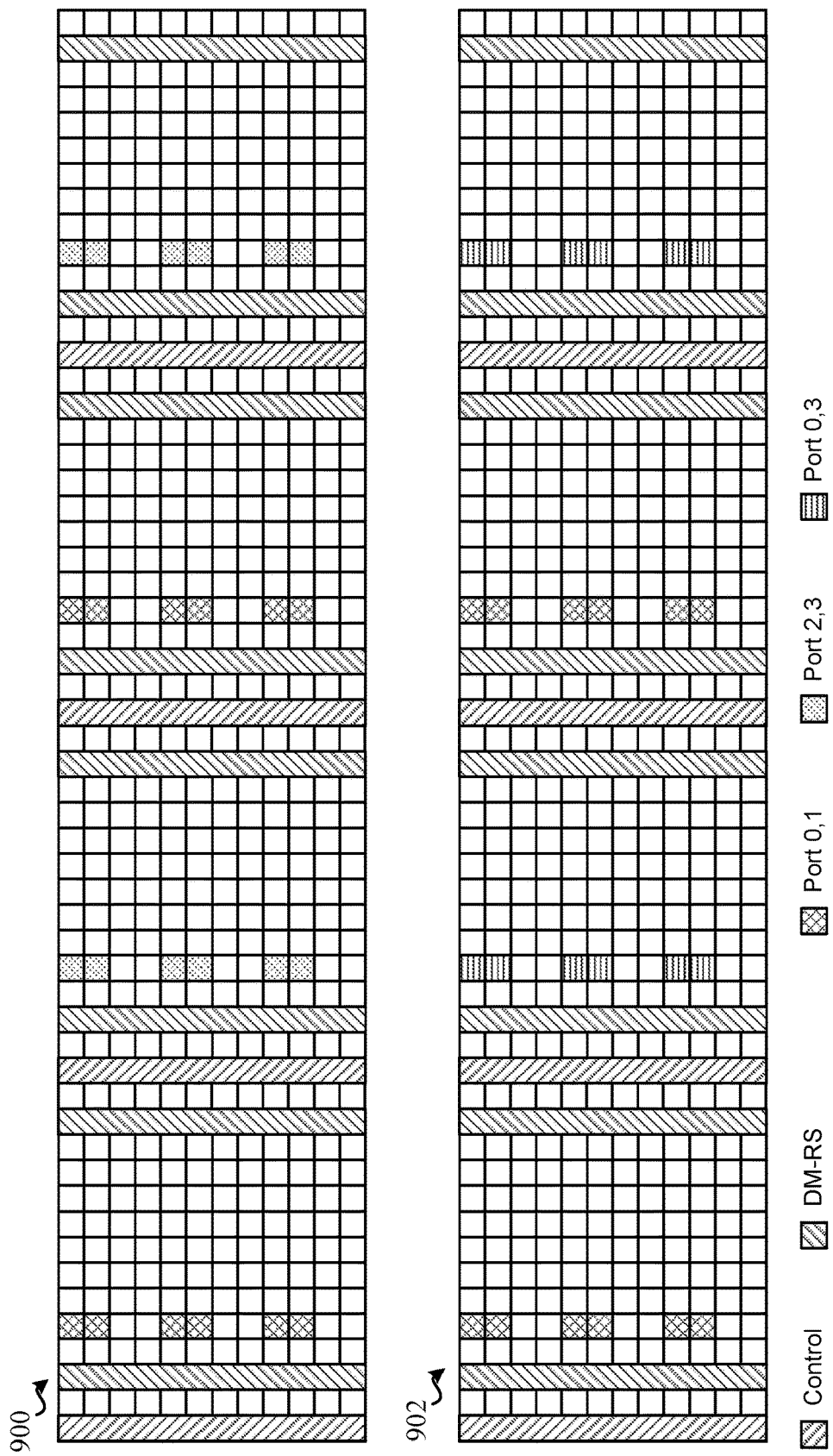
FIG. 9 illustrates examples of resource allocations for reference signals having frequency density across multiple slots, in accordance with various aspects of the present disclosure.

Examples of resource allocations and associated CSI-RS configurations are illustrated in FIGS. 6-9, at resource allocations 600, 700, 800, and 900, respectively. For example, in FIG. 6, resource allocation 600 illustrates a plurality of symbols (e.g., OFDM, SC-FDM, etc. symbols, represented horizontally in time) each having a plurality of REs (e.g., divisions of frequency, represented vertically). In one example, the plurality of symbols may form a slot of the wireless communication technology (e.g., 5G NR). For example, slots in 5G NR can include collections of 12 or 14 symbols, where the number of symbols in the slot may depend at least in part on whether a normal cyclic prefix (CP) or an extended CP is used. Resource allocation 600 illustrates a control symbol 610 as the first symbol of the slot (e.g., over which downlink control can be transmitted by the base station), demodulation RS (DMRS) 612 in symbols 2 and 12, and CSI-RSs in certain REs of symbols 4 and 9. Resource allocation 600 illustrates symbol 4 as having adjacent sets of REs for transmitting CSI-RS for antenna ports 0, 1 (labeled as "0,1" in the Figure), where the REs are uniformly spaced in frequency (e.g., have a similar number of other REs between the REs for transmitting CSI-RS for antenna ports 0, 1). Resource allocation 600 illustrates symbol 9 as having adjacent sets of REs for transmitting CSI-RS for antenna ports 2, 3 (labeled as "2,3" in the Figure), where the REs are at least substantially uniformly spaced in frequency, and using the same REs in frequency as the CSI-RS for antenna ports 0, 1 in symbol 4. FIGS. 7-9 show other CSI-RS configurations, as described in further detail below.

In method 500, at Block 502, a plurality of RS configurations, each indicating REs for an antenna port over which RSs for the antenna port are scheduled, can be received. In an aspect, the RS determining component 342, e.g., in conjunction with processor(s) 305, memory 302, transceiver 370 and/or communicating component 340, can receive the plurality of RS configurations, with each RS configuration indicating REs for an antenna port over which RSs for the antenna port are scheduled. As described, in an example, a given RS configuration may apply to two or more antenna ports (e.g., referring to FIG. 6, a CSI-RS configuration can be received for antenna ports 0, 1, indicating the REs in symbol 4 over which the CSI-RS for antenna ports 0, 1 are transmitted). In the example of FIG. 6, RS configuring component 242 can transmit, and/or RS determining component 342 can receive from the base station 105, RS configurations for antenna ports 0, 1 and for antenna ports 2, 3 (e.g., over RRC signaling, dedicated control signaling, broadcast signaling, etc., as described). One or more of the RS configurations, in a specific example, may correspond to NZP CSI-RS configurations.

In method 400, at Block 404, an association configuration indicating an association between at least two antenna ports as relating to similar characteristics can be transmitted. In an aspect, the RS associating component 244, e.g., in conjunction with processor(s) 205, memory 202, transceiver 270 and/or scheduling component 240, can transmit the association configuration indicating the association between the at least two antenna ports (or between corresponding REs) as relating to (or having) similar channel characteristics. For example, transceiver 270 may subsequently transmit RSs over the REs indicated as being associating by using similar channel characteristics to effectively increase density of the RSs. The association, for example, can be used to indicate that the same channel can be measured through the antenna ports indicated in the association or that the antenna ports are otherwise quasi co-located with respect to receiver spatial parameters and/or delay spread, and/or Doppler spread, and/or average delay, and/or Doppler shift, or a combination of them. In this regard, for example, the at least two antenna ports can enable measurement of the exact same channel (e.g., instead of two channels having similar channel characteristics). This can allow the UE 115 to perform tracking functions, such as fine time/frequency tracking associated with the base station 105, Doppler spread estimation, delay spread estimation, average delay, Doppler spread, and/or the like based on the RSs received over REs corresponding to the associated antenna ports.

In an example, RS associating component 244 can determine to associate the antenna ports or related REs based at least in part on properties of the REs (e.g., based on determining that the REs for the antenna ports are of similar frequency in later symbols—as in resource allocation 600, based on determining that the REs for the antenna ports include REs that are uniformly spaced in the same symbol—as in resource allocation 700, etc.). In another example, RS associating component 244 can determine to associate the antenna ports or related REs based on a configuration stored in memory 202, where the configuration may indicate to associate the antenna ports. In any case, RS associating component 244 can transmit the indication of the association using RRC signaling, dedicated signaling, broadcast signaling, and/or the like, as described. For example, RS associating component 244 can indicate the association between antenna ports or between the associated REs. In one example, RS associating component 244 can indicate the association as applied to antenna ports on one or more given symbols or other resources (e.g., port 0.0 of a CSI-RS resource 0 on a first symbol can be associated with port 1.0, and port 1.1, of a CSI-RS resource 1), where the notation X.Y refers to the Yth port of the Xth CSI-RS resource that has been configured. In an example, RS associating component 244 can associate REs that have the same or similar periodicity, bandwidth, and/or subcarrier location within a symbol and/or a corresponding slot.

Referring to FIG. 6, for example, RS associating component 244 may indicate an association of at least two antenna ports that are in different symbols of a slot. For example, RS associating component 244 may indicate an association of antenna ports 0 and 2, and may transmit corresponding CSI-RS with similar channel characteristics. Thus, the UE 115 can effectively receive the CSI-RSs in symbols 4 and 9, and can associate the CSI-RSs, as shown in resource allocation 602, for performing channel measurement for purposes of tracking. In this regard, the UE 115 may perform a tracking function, as described, using 6 REs that are diverse in frequency and time, which can allow the UE to better estimate time/frequency for tracking purposes, estimate a Doppler or delay spread, etc., over using just the REs corresponding to the CSI-RS for antenna port 0. In this example, as the CSI-RS is configured with some density in frequency (in resource allocation 600), the association can occur across antenna ports in different symbols to obtain multiple REs for channel measurement. In this example, the density in each PRB is 3 REs per antenna port, but all REs carrying one port appear in the same OFDM symbol. This specific example configuration may not be desirable for Doppler estimation and frequency offset tracking. Thus, RS associating component 244 can configure two such CSI-RS resources, and then associate the antenna port of the first CSI-RS resources with the port of the second, so eventually an effective port with a density of 6 REs is achieved (port 0 in resource allocation 602) over more than one OFDM symbol.

Similarly, referring to FIG. 7, for example, RS associating component 244 may indicate an association of at least two antenna ports that are in the same set of multiple symbols of a slot, and are uniformly spaced over frequency (e.g., have a similar number of other REs between REs assigned for transmitting RSs for the at least two antenna ports). For example, RS associating component 244 may indicate an association of antenna ports 0, 2, and 4, and may transmit corresponding CSI-RS with similar channel characteristics. Thus, the UE 115 can effectively receive the CSI-RSs in respective REs over symbols 4 and 9, and can associate the CSI-RSs, as shown in resource allocation 702, for performing channel measurement for purposes of tracking. In this example, as the CSI-RS is configured with some density in time (in resource allocation 700) such that each CSI-RS is configured in multiple symbols (4 and 9), the association can occur across antenna ports in the same symbols to obtain multiple REs for channel measurement. In this example, the density in each PRB is 2 REs per antenna port, but all REs carrying one port appear in different OFDM symbols. This may not be desirable for delay spread estimation and time offset tracking. Thus, RS associating component 244 can configure three such CSI-RS resources, and then associate the antenna port of the first CSI-RS resource with a port of the second CSI-RS resource and a port in the third CSI-RS resource, so eventually an effective port with a density of 6 REs is achieved (port 0 in resource allocation 702) for performing the one or more tracking purposes related to the base station 105 and/or communications therewith.

Referring to FIGS. 8A and 8B, for example, RS associating component 244 may indicate an association of at least two antenna ports that are in different symbols of a slot, and are uniformly spaced over frequency, such that de-staggering the REs in time would result in the uniform spacing over the frequency. For example, RS associating component 244 may indicate an association of antenna ports 0, 2, 4, 6, 8, and 10, and may transmit corresponding CSI-RS with similar channel characteristics. Thus, the UE 115 can effectively receive the CSI-RSs in symbols 4, 7, and 10, and can associate the CSI-RSs, as shown in resource allocation 802, for performing channel measurement for purposes of tracking. In this example, as the CSI-RS is configured with some density in time (in resource allocation 800) such that some CSI-RSs are configured in multiple symbols (4 and 10), and some are configured in one symbol (symbol 7), the association can occur across antenna ports that would have REs uniformly spaced in frequency if de-staggered in the time domain. In this example, RS associating component 244 can configure ten CSI-RS resources, and then associate the antenna port of the first CSI-RS resource (port 0) with multiple ports (2, 4, 6, 8, 10) that are uniformly spaced in frequency if de-staggered in the time domain, so eventually an effective port with a density of 9 REs is achieved (port 0 in resource allocation 802).

Referring to FIG. 9, for example, RS associating component 244 may indicate an association of at least two antenna ports that are in different slots. For example, RS associating component 244 may indicate an association of antenna ports 0 and 2, which are transmitted in different slots, and may transmit corresponding CSI-RS with similar channel characteristics across the different slots. Thus, the UE 115 can effectively receive the CSI-RSs in the separate slots (in symbol 4), and can associate the CSI-RSs as having similar channel characteristics, as shown in resource allocation 902, for performing channel measurement for purposes of tracking.

In method 500, at Block 504, an association configuration indicating an association between at least two antenna ports as relating to similar channel characteristics can be received. In an aspect, the association determining component 344, e.g., in conjunction with processor(s) 305, memory 302, transceiver 370 and/or communicating component 340, can receive the association configuration indicating the association between the at least two antenna ports as relating to (or having) similar channel characteristics. For example, association determining component 344 can receive the association configuration from the base station 105 via RRC signaling, dedicated signaling, broadcast signaling, etc., as described. For example, the association configuration may indicate an association between multiple antenna ports (or related REs). In another example, the association configuration may indicate multiple associations between multiple antenna ports (or related REs) such that multiple sets of RSs could be used to perform tracking functions.

For example, the association configuration may explicitly identify antenna ports to be associated (e.g., by port number), may indicate to associate configured antenna ports (e.g., using a binary indicator to associate antenna ports for which CSI-RS have been configured), and/or the like. The association determining component 344 can receive and determine how to associate antenna ports (or associated REs) based on the explicit indication of the antenna ports, the indication to associate configured antenna ports (e.g., configured for CSI-RS to the UE 115), etc. In one example, association determining component 344 can determine an antenna port with the same port index of configured NZP CSI-RS resources in the CSI-RS resource set is the same.

In method 400, at Block 406, based at least in part on the association configuration, RSs can be transmitted based on the similar channel characteristics over the REs corresponding to the at least two antenna ports. In an aspect, the RS configuring component 242, e.g., in conjunction with processor(s) 205, memory 202, transceiver 270 and/or scheduling component 240, can transmit, based at least in part on the association configuration, RSs based on the similar channel characteristics over the REs corresponding to the at least two antenna ports (e.g., as indicated in the corresponding RS configuration(s)). For example, in reference to FIG. 6, the RS configuring component 242 can transmit CSI-RSs in REs associated with antenna port 0 and 2 in resource allocation 600 (shown as associated with antenna port 0 in resource allocation 602) using similar channel characteristics. For example, to achieve the similar channel characteristics, RS configuring component 242 can transmit RSs for the antenna ports in the corresponding REs using the same or similar analog or digital precoder. For example, in reference to FIG. 7, the RS configuring component 242 can transmit CSI-RSs in REs associated with antenna port 0, 2, and 4 in resource allocation 700 (shown as associated with antenna port 0 in resource allocation 702) using similar channel characteristics. For example, in reference to FIGS. 8A and 8B, the RS configuring component 242 can transmit CSI-RSs in REs associated with antenna port 0, 2, 4, 6, 8, and 10 in resource allocation 800 (shown as associated with antenna port 0 in resource allocation 802) using similar channel characteristics. For example, in reference to FIG. 9, the RS configuring component 242 can transmit CSI-RSs in REs associated with antenna port 0 and 2 in resource allocation 900 (shown as associated with antenna port 0 in resource allocation 902) using similar channel characteristics across the multiple slots.

In method 500, at Block 506, a plurality of RSs in the REs corresponding to the at least two antenna ports can be received. In an aspect, the RS determining component 342, e.g., in conjunction with processor(s) 305, memory 302, transceiver 370 and/or communicating component 340, can receive the plurality of RSs in the REs corresponding to the at least two antenna ports. For example, RS determining component 342 can receive the RSs in REs specified in at least some of the received RS configurations (e.g., as shown in allocations 600, 700, 800, 900).

In method 500, at Block 508, a channel measurement of at least a portion of the plurality of RSs received over the REs corresponding to the at least two antenna ports can be performed based at least in part on the association configuration. In an aspect, the channel measuring component 346, e.g., in conjunction with processor(s) 305, memory 302, transceiver 370 and/or communicating component 340, can perform, based at least in part on the association configuration, the channel measurement of at least the portion of the plurality of RSs received over the REs corresponding to the at least two antenna ports. For example, channel measuring component 346 can use the at least two antenna ports to measure the exact same channel, and can, for example, coherently combine the reference signals of the different antenna ports to estimate one channel. Said differently, for example, channel measuring component 346 can consider or assume the at least two antenna ports as being the same antenna port (e.g., for the purposes of channel estimation). For example, communicating component 340 can receive the RSs for the antenna ports in the corresponding REs based on the same or similar analog or digital precoder, and can accordingly perform the channel measurement based on the collective REs.

In method 500, optionally at Block 510, at least one of a time tracking value, a frequency tracking value, a Doppler spread estimation value, or a delay spread estimation value can be determined based at least in part on the channel measurement. In an aspect, the channel measuring component 346, e.g., in conjunction with processor(s) 305, memory 302, transceiver 370 and/or communicating component 340, can determine at least one of a time tracking value, a frequency tracking value, a Doppler spread estimation value, or a delay spread estimation value based at least in part on the channel measurement. In an example, communicating component 340 can use such values in estimating or otherwise decoding a channel in downlink communications from the base station 105. For example, channel measuring component 346 can determine the one or more values similarly to determining such values in LTE based on a CRS or other tracking signal (e.g., based on comparing properties of signals received over the slot and assumed to be transmitted using similar channel characteristics).

In method 500, optionally at Block 512, an indication of CSI measured for antenna ports associated with the plurality of RS configurations can be transmitted. In an aspect, the channel measuring component 346, e.g., in conjunction with processor(s) 305, memory 302, transceiver 370 and/or communicating component 340, can measure and/or transmit the indication of CSI measured for antenna ports associated with the plurality of RS configurations (e.g., to the base station 105). Thus, the UE 115 can not only perform tracking functions based on the combined CSI-RSs, but can also transmit CSI based on one or more of the received CSI-RSs.

Additionally in this regard, in method 400, optionally at Block 408, one or more parameters related to CSI can be received based on transmitting the RSs. In an aspect, scheduling component 240, e.g., in conjunction with processor(s) 205, memory 202, and/or transceiver 270, can receive the one or more parameters related to CSI based on transmitting the RSs. This can allow the base station 105 to select an antenna port for transmitting control and/or data communications with the UE 115.

Figure 10:
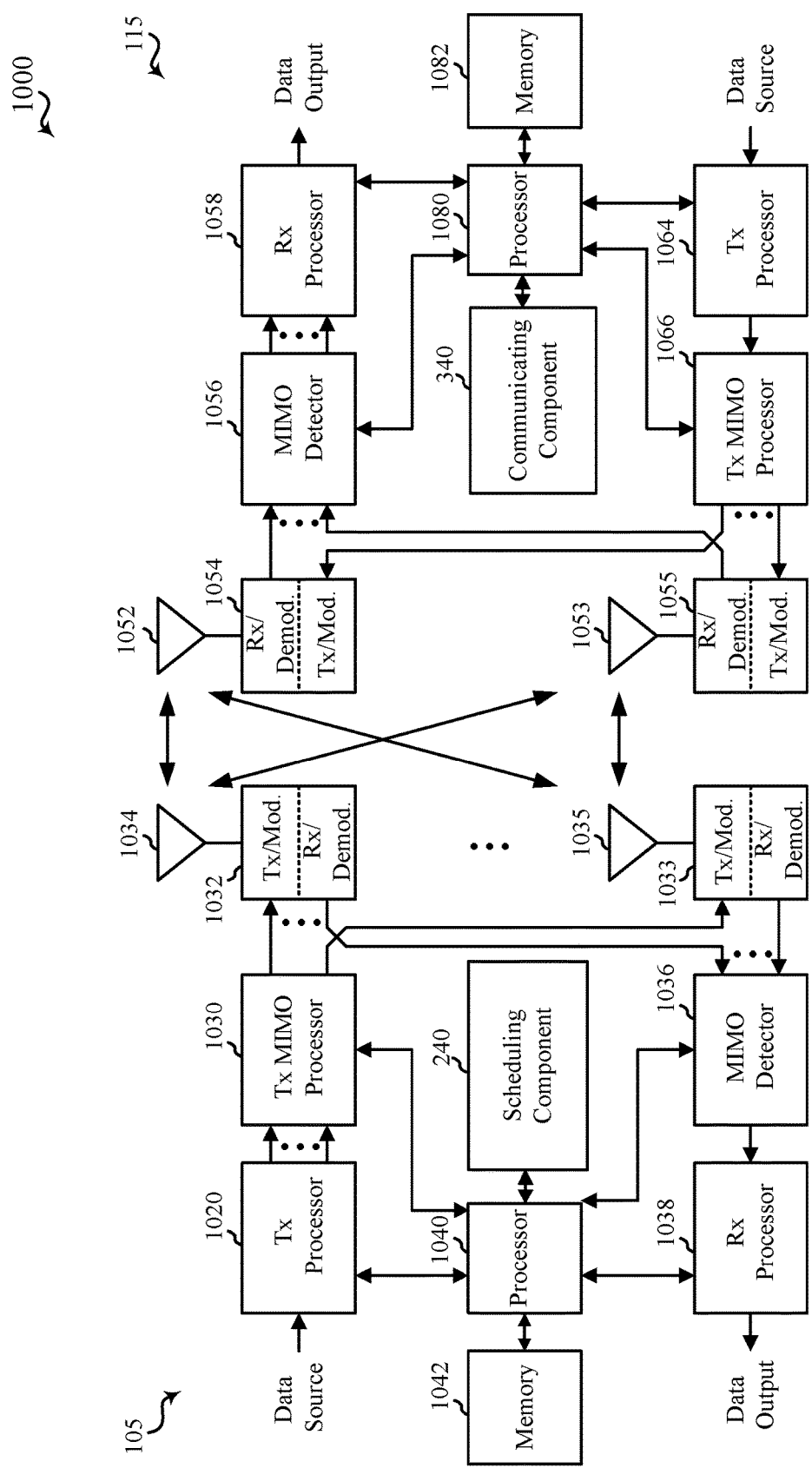
FIG. 10 is a block diagram illustrating an example of a MIMO communication system including a base station and a UE, in accordance with various aspects of the present disclosure.

FIG. 10 is a block diagram of a MIMO communication system 1000 including a base station 105 and a UE 115. The MIMO communication system 1000 may illustrate aspects of the wireless communication system 100 described with reference to FIG. 1. The base station 105 may be an example of aspects of the base station 105 described with reference to FIGS. 1-3. The base station 105 may be equipped with antennas 1034 and 1035, and the UE 115 may be equipped with antennas 1052 and 1053. In the MIMO communication system 1000, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 115 may be an example of aspects of the UEs 115 described with reference to FIGS. 1-3. At the UE 115, the UE antennas 1052 and 1053 may receive the DL signals from the base station 105 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 115 to a data output, and provide decoded control information to a processor 1080, or memory 1082.

The processor 1080 may in some cases execute stored instructions to instantiate a communicating component 340 (see e.g., FIGS. 1 and 3).

On the uplink (UL), at the UE 115, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 105 in accordance with the communication parameters received from the base station 105. At the base station 105, the UL signals from the UE 115 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 1000.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for increasing density of reference signal transmissions in wireless communications, comprising:
   receiving a first reference signal configuration indicating a first set of resource elements over which reference signals for a first set of one or more antenna ports are scheduled for transmission;
   receiving a second reference signal configuration indicating a second set of resource elements over which reference signals for a second set of one or more antenna ports are scheduled for transmission, wherein the first set of one or more antenna ports is different than the second set of one or more antenna ports;
   receiving an association configuration indicating an association between at least two antenna ports, wherein the at least two antenna ports include a first antenna port in the first set of one or more antenna ports and a second antenna port in the second set of one or more antenna ports;
   receiving a plurality of reference signals including a first reference signal in the first set of resource elements and a second reference signal in the second set of resource elements; and
   performing, based at least in part on the association configuration, a channel measurement of at least one channel characteristic of a channel associated with the first antenna port based on tat least the first reference signal and the second reference signal.

2. The method of claim 1, wherein the association configuration indicates that the at least two antenna ports are quasi co-located with respect to at least one of receiver spatial parameters, delay spread, Doppler spread, average delay, Doppler shift, or a combination thereof.

3. The method of claim 1, wherein the association configuration indicates that the at least two antenna ports can be assumed to be the same antenna port.

4. The method of claim 1, wherein the at least one channel characteristic includes at least one of a time tracking value, a frequency tracking value, a Doppler spread estimation value, or a delay spread estimation value.

5. The method of claim 1, wherein the receiving the plurality of reference signals comprises receiving the plurality of reference signals over the resource elements for the at least two antenna ports that are in different symbols of a slot.

6. The method of claim 1, wherein the receiving the plurality of reference signals comprises receiving the plurality of reference signals in the resource elements corresponding to the at least two antenna ports that are in the same multiple symbols of a slot, and are uniformly spaced over frequency.

7. The method of claim 1, wherein the receiving the plurality of reference signals comprises receiving the plurality of reference signals in the resource elements corresponding to the at least two antenna ports that are in different symbols of a slot, and are uniformly spaced over frequency.

8. The method of claim 1, wherein the receiving the plurality of reference signals comprises receiving the plurality of reference signals in the resource elements corresponding to the at least two antenna ports that are in different slots.

9. The method of claim 1, wherein receiving the plurality of reference signals comprises receiving a plurality of channel state information (CSI) reference signals transmitted by an access point based on a plurality of reference signal configurations.

10. The method of claim 9, further comprising measuring, based at least in part on at least a portion of the plurality of CSI reference signals, channel state information for each of the at least two antenna ports, and transmitting an indication of the measured channel state information to the access point.

11. The method of claim 1, wherein the first set of one or more antenna ports includes multiple antenna ports, and wherein the second set of one or more antenna ports includes multiple antenna ports.

12. An apparatus for wireless communication, comprising:
a transceiver for communicating one or more wireless signals via at least a transmitter and one or more antennas;
a memory configured to store instructions; and
one or more processors communicatively coupled with the transceiver and the memory, wherein the one or more processors are configured to:
receive a first reference signal configuration indicating a first set of resource elements over which reference signals for a first set of one or more antenna ports are scheduled for transmission;
receive a second reference signal configuration indicating a second set of resource elements over which reference signals for a second set of one or more antenna ports are scheduled for transmission, wherein the first set of one or more antenna ports is different than the second set of one or more antenna ports;
receive an association configuration indicating an association between at least two antenna ports, wherein the at least two antenna ports include a first antenna port in the first set of one or more antenna ports and a second antenna port in the second set of one or more antenna ports;
receive a plurality of reference signals including a first reference signal in the first set of resource elements and a second reference signal in the second set of resource elements; and
perform, based at least in part on the association configuration, a channel measurement of at least one channel characteristic of a channel associated with the first antenna port based on at least the first reference signal and the second reference signal.

13. The apparatus of claim 12, wherein the association configuration indicates that the at least two antenna ports are quasi co-located with respect to at least one of receiver spatial parameters, delay spread, Doppler spread, average delay, Doppler shift, or a combination thereof.

14. The apparatus of claim 12, wherein the at least one channel characteristic includes at least one of a time tracking value, a frequency tracking value, a Doppler spread estimation value, or a delay spread estimation value.

15. The apparatus of claim 12, wherein the one or more processors are configured to receive the plurality of reference signals over the resource elements for the at least two antenna ports that are in different symbols of a slot.

16. The apparatus of claim 12, wherein the one or more processors are configured to perform the channel measurement of the similar channel characteristics of channels over the at least two antenna ports.

17. The apparatus of claim 12, wherein the one or more processors are configured to receive the plurality of reference signals in the resource elements corresponding to the at least two antenna ports that are in the same multiple symbols of a slot or in different multiple symbols of the slot, and are uniformly spaced over frequency.

18. The apparatus of claim 12, wherein the one or more processors are configured to receive the plurality of reference signals in the resource elements corresponding to the at least two antenna ports that are in different slots.

19. An apparatus for wireless communication, comprising:
means for receiving a first reference signal configuration indicating a first set of resource elements over which reference signals for a first set of one or more antenna ports are scheduled for transmission;
means for receiving a second reference signal configuration indicating a second set of resource elements over which reference signals for a second set of one or more antenna ports are scheduled for transmission, wherein the first set of one or more antenna ports is different than the second set of one or more antenna ports;
means for receiving an association configuration indicating an association between at least two antenna ports, wherein the at least two antenna ports include a first antenna port in the first set of one or more antenna ports and a second antenna port in the second set of one or more antenna ports;
means for receiving a plurality of reference signals including a first reference signal in the first set of resource elements and a second reference signal in the second set of resource elements; and
means for performing, based at least in part on the association configuration, a channel measurement of at least one channel characteristic of a channel associated with the first antenna port based on at least the first reference signal and the second reference signal.

20. The apparatus of claim 19, wherein the association configuration indicates that the at least two antenna ports are quasi co-located with respect to at least one of receiver spatial parameters, delay spread, Doppler spread, average delay, Doppler shift, or a combination thereof.

21. The apparatus of claim 19, wherein the at least one channel characteristic includes at least one of a time tracking value, a frequency tracking value, a Doppler spread estimation value, or a delay spread estimation value.

22. The apparatus of claim 19, wherein the means for receiving the plurality of reference signals receives the plurality of reference signals over the resource elements for the at least two antenna ports that are in different symbols of a slot.

23. The apparatus of claim 19, wherein the means for performing performs the channel measurement of the similar channel characteristics of channels over the at least two antenna ports.

24. The apparatus of claim 19, wherein the means for receiving the plurality of reference signals receives the plurality of reference signals in the resource elements corresponding to the at least two antenna ports that are in the same multiple symbols of a slot or in different symbols of the slot, and are uniformly spaced over frequency.

25. The apparatus of claim 19, wherein the means for receiving the plurality of reference signals receives the plurality of reference signals in the resource elements corresponding to the at least two antenna ports that are in different slots.

26. A non-transitory computer-readable medium, comprising code executable by one or more processors for wireless communication, the code comprising:
code for receiving a first reference signal configuration indicating a first set of resource elements over which reference signals for a first set of one or more antenna ports are scheduled for transmission;

code for receiving a second reference signal configuration indicating a second set of resource elements over which reference signals for a second set of one or more antenna ports are scheduled for transmission, wherein the first set of one or more antenna ports is different than the second set of one or more antenna ports;

code for receiving an association configuration indicating an association between at least two antenna ports, wherein the at least two antenna ports include a first antenna port in the first set of one or more antenna ports and a second antenna port in the second set of one or more antenna ports;

code for receiving a plurality of reference signals including a first reference signal in the first set of resource elements and a second reference signal in the second set of resource elements; and code for performing, based at least in part on the association configuration, a channel measurement of at least one channel characteristic of a channel associated with the first antenna port based on at least the first reference signal and the second reference signal.

27. The non-transitory computer-readable medium of claim 26, wherein the association configuration indicates that the at least two antenna ports are quasi co-located with respect to at least one of receiver spatial parameters, delay spread, Doppler spread, average delay, Doppler shift, or a combination thereof.

28. The non-transitory computer-readable medium of claim 26, wherein the at least one channel characteristic includes at least one of a time tracking value, a frequency tracking value, a Doppler spread estimation value, or a delay spread estimation value.

29. The non-transitory computer-readable medium of claim 26, wherein the code for receiving the plurality of reference signals receives the plurality of reference signals over the resource elements for the at least two antenna ports that are in different symbols of a slot.

30. The non-transitory computer-readable medium of claim 26, wherein the code for receiving the plurality of reference signals receives the plurality of reference signals in the resource elements corresponding to the at least two antenna ports that are in the same multiple symbols of a slot or different multiple symbols of the slot, and are uniformly spaced over frequency.

31. The non-transitory computer-readable medium of claim 26, wherein the code for receiving the plurality of reference signals receives the plurality of reference signals in the resource elements corresponding to the at least two antenna ports that are in different slots.

32. A method for increasing density of reference signal transmissions in wireless communications, comprising:

transmitting a first reference signal configuration indicating a first set of resource elements over which reference signals for a first set of one or more antenna ports are scheduled for transmission;

transmitting a second reference signal configuration indicating a second set of resource elements over which reference signals for a second set of one or more antenna ports are scheduled for transmission, wherein the first set of one or more antenna ports is different than the second set of one or more antenna ports;

transmitting an association configuration indicating an association between at least two antenna ports, wherein the at least two antenna ports include a first antenna port in the first set of one or more antenna ports and a second antenna port in the second set of one or more antenna ports; and transmitting, based at least in part on the association configuration, reference signals, including a first reference signal in the first set of resource elements and a second reference signal in the second set of resource elements, based on at least one channel characteristic that is the same among the first reference signal and the second reference signal.

33. The method of claim 32, wherein transmitting the reference signals comprises transmitting the reference signals in the resource elements corresponding to the at least two antenna ports that are in different symbols of a slot.

34. The method of claim 32, wherein transmitting the reference signals comprises transmitting the reference signals in the resource elements corresponding to the at least two antenna ports that are in the same set of multiple symbols of a slot, and are uniformly spaced over frequency.

35. The method of claim 32, wherein transmitting the reference signals comprises transmitting the reference signals in the resource elements corresponding to the at least two antenna ports that are in different symbols of a slot, and are uniformly spaced over frequency.

36. The method of claim 32, wherein transmitting the reference signals comprises transmitting the reference signals in the resource elements corresponding to the at least two antenna ports that are in different slots.

37. The method of claim 32, wherein the reference signals are channel state information (CSI) reference signals.

38. The method of claim 37, further comprising receiving, from a device receiving the CSI reference signals, one or more parameters related to CSI based on the CSI reference signals.

39. An apparatus for wireless communication, comprising:

a transceiver for communicating one or more wireless signals via at least a transmitter and one or more antennas;

a memory configured to store instructions; and one or more processors communicatively coupled with the transceiver and the memory, wherein the one or more processors are configured to:

transmit a first reference signal configuration indicating a first set of resource elements over which reference signals for a first set of one or more antenna ports are scheduled for transmission;

transmit a second reference signal configuration indicating a second set of resource elements over which reference signals for a second set of one or more antenna ports are scheduled for transmission, wherein the first set of one or more antenna ports is different than the second set of one or more antenna ports;

transmit an association configuration indicating an association between at least two antenna ports, wherein the at least two antenna ports include a first antenna port in the first set of one or more antenna ports and a second antenna port in the second set of one or more antenna ports; and transmit, based at least in part on the association configuration, reference signals, including a first reference signal in the first set of resource elements and a second reference signal in the second set of resource elements, based on at least one channel characteristic that is the same among the first reference signal and the second reference signal.

40. The apparatus of claim 39, wherein the one or more processors are configured to transmit the reference signals in the resource elements corresponding to the at least two antenna ports that are in different symbols of a slot.

41. The apparatus of claim 39, wherein the one or more processors are configured to transmit the reference signals in the resource elements corresponding to the at least two antenna ports that are in the same set of multiple symbols of a slot, and are uniformly spaced over frequency.

42. The apparatus of claim 39, wherein the one or more processors are configured to transmit the reference signals in the resource elements corresponding to the at least two antenna ports that are in different symbols of a slot, and are uniformly spaced over frequency.

43. The apparatus of claim 39, wherein the one or more processors are configured to transmit the reference signals in the resource elements corresponding to the at least two antenna ports that are in different slots.

44. An apparatus for wireless communication, comprising:
  means for transmitting a first reference signal configuration indicating a first set of resource elements over which reference signals for a first set of one or more antenna ports are scheduled for transmission;
  means for transmitting a second reference signal configuration indicating a second set of resource elements over which reference signals for a second set of one or more antenna ports are scheduled for transmission, wherein the first set of one or more antenna ports is different than the second set of one or more antenna ports;
  means for transmitting an association configuration indicating an association between at least two antenna ports, wherein the at least two antenna ports include a first antenna port in the first set of one or more antenna ports and a second antenna port in the second set of one or more antenna ports; and
  means for transmitting, based at least in part on the association configuration, reference signals, including a first reference signal in the first set of resource elements and a second reference signal in the second set of resource elements, based on at least one channel characteristic that is the same among the first reference signal and the second reference signal.

45. The apparatus of claim 44, wherein the means for transmitting the reference signals transmits the reference signals in the resource elements corresponding to the at least two antenna ports that are in different symbols of a slot.

46. The apparatus of claim 44, wherein the means for transmitting the reference signals transmits the reference signals in the resource elements corresponding to the at least two antenna ports that are in the same set of multiple symbols of a slot, and are uniformly spaced over frequency.

47. The apparatus of claim 44, wherein the means for transmitting the reference signals transmits the reference signals in the resource elements corresponding to the at least two antenna ports that are in different symbols of a slot, and are uniformly spaced over frequency.

48. The apparatus of claim 44, wherein the means for transmitting the reference signals transmits the reference signals in the resource elements corresponding to the at least two antenna ports that are in different slots.

49. A non-transitory computer-readable medium, comprising code executable by one or more processors for wireless communication, the code comprising:
  code for transmitting a first reference signal configuration indicating a first set of resource elements over which reference signals for a first set of one or more antenna ports are scheduled for transmission;
  code for transmitting a second reference signal configuration indicating a second set of resource elements over which reference signals for a second set of one or more antenna ports are scheduled for transmission, wherein the first set of one or more antenna ports is different than the second set of one or more antenna ports;
  code for transmitting an association configuration indicating an association between at least two antenna ports, wherein the at least two antenna ports include a first antenna port in the first set of one or more antenna ports and a second antenna port in the second set of one or more antenna ports; and
  code for transmitting, based at least in part on the association configuration, reference signals, including a first reference signal in the first set of resource elements and a second reference signal in the second set of resource elements, based on at least one channel characteristic that is the same among the first reference signal and the second reference signal.

50. The non-transitory computer-readable medium of claim 49, wherein the code for transmitting the reference signals transmits the reference signals in the resource elements corresponding to the at least two antenna ports that are in different symbols of a slot.

51. The non-transitory computer-readable medium of claim 49, wherein the code for transmitting the reference signals transmits the reference signals in the resource elements corresponding to the at least two antenna ports that are in the same set of multiple symbols of a slot, and are uniformly spaced over frequency.

52. The non-transitory computer-readable medium of claim 49, wherein the code for transmitting the reference signals transmits the reference signals in the resource elements corresponding to the at least two antenna ports that are in different symbols of a slot, and are uniformly spaced over frequency.

53. The non-transitory computer-readable medium of claim 49, wherein the code for transmitting the reference signals transmits the reference signals in the resource elements corresponding to the at least two antenna ports that are in different slots.

* * * * *